United States Patent
Enomoto et al.

(10) Patent No.: US 6,341,251 B1
(45) Date of Patent: Jan. 22, 2002

(54) REAR WHEEL STEERING CONTROL SYSTEM FOR REAR TWO-AXLE VEHICLE

(75) Inventors: Mitsuru Enomoto; Ryoe Watanabe, both of Tokyo (JP)

(73) Assignee: Hino Motors, Ltd., Tokyo (JP)

( * ) Notice: Subject to any disclaimer, the term of this patent is extended or adjusted under 35 U.S.C. 154(b) by 0 days.

(21) Appl. No.: 09/651,838

(22) Filed: Aug. 31, 2000

(30) Foreign Application Priority Data

Aug. 31, 1999 (JP) ............................................ 11-244700

(51) Int. Cl.[7] .............................................. B62D 7/14
(52) U.S. Cl. ...................................................... 701/41
(58) Field of Search ........................... 701/41; 180/443, 180/445

(56) References Cited

U.S. PATENT DOCUMENTS 5,035,439 A * 7/1991 Petrillo ....................... 280/81.6
5,329,451 A * 7/1994 Notsu .......................... 701/41

* cited by examiner

Primary Examiner—Michael J. Zanelli
(74) Attorney, Agent, or Firm—Reed Smith LLP (57) ABSTRACT

There is provided a rear front wheel steering control system for a rear two-axle vehicle, which can steer rear front wheels by means of relatively small sized rear front wheel steering device, and thereby can start a vehicle smoothly. Front wheel steering device and rear front wheel steering device are driven by an engine. A controller controls the engine, and also controls the rear front wheel steering device so as to steer rear front wheels in the same direction as that of front wheels based on the detection outputs of the front steering angle sensor of the front wheel and the vehicle speed sensor. When the vehicle speed sensor detects a vehicle speed lower than a first reference value, and a difference in steering angle between a target steering angle based on the steering angle of the front wheel and an actually-measured steering angle of the rear front wheel is larger than a second reference value, the controller increases the rotational speed of the engine to a third reference value. Also, when the difference in steering angle becomes smaller than the second reference value or when a predetermined time has elapsed, the controller returns the rotational speed of the engine to the original value.

4 Claims, 8 Drawing Sheets

REAR WHEEL STEERING CONTROL SYSTEM FOR REAR TWO-AXLE VEHICLE

BACKGROUND OF THE INVENTION

1. Field of the Invention

The present invention relates to a system for controlling a steering angle of rear front wheels of a rear two-axle vehicle, such as a truck, having a rear front axle and a rear rear axle.

2. Description of Related Art

Conventionally, there has been disclosed a steering angle ratio control system as a system for steering rear wheels, which is configured so that a rear wheel steering angle corresponding to a steering wheel angle is controlled by an electro-hydraulic control circuit in relation to a vehicle speed, the electro-hydraulic control circuit increases the steering angle ratio of rear wheel to front wheel at the time of low speed and decreases the steering angle ratio with increasing vehicle speed, and further makes the steering angle ratio zero when the vehicle speed is higher than a predetermined value (Unexamined Japanese Patent Publication 1990-124381) (hereinafter referred to as a first conventional example). In this system, the rotation of an input shaft rotated in relation to an output shaft of a front wheel steering mechanism is transmitted to a differential control valve via a steering angle ratio control mechanism in relation to the vehicle speed, and a hydraulic circuit to a rear wheel steering actuator is controlled by the differential control valve. Also, the rear wheels are steered by the rear wheel steering actuator, and the steering angle ratio control mechanism is controlled by the electro-hydraulic circuit. The steering angle ratio control mechanism, which is provided on the input shaft, has a protrusion which rotates in response to the steering wheel angle and a notch which is formed in a notch member provided at the distal end of a drive shaft of the differential control valve and engages with the protrusion with a gap formed in the peripheral direction.

In the steering angle ratio control system configured as described above, the electro-hydraulic control circuit regulates the magnitude of the gap between the protrusion and the notch in relation to the vehicle speed, that is, it controls the width of a dead zone (play) from the neutral position of a steering wheel until the turning of the drive shaft is conveyed, in relation to the vehicle speed.

Therefore, the steering angle ratio of the rear wheel steering angle to the front wheel steering angle decreases gradually as the vehicle speed increases. As a result, in low-speed running, the rear wheels are steered relatively greatly in antiphase with the front wheels, so that small sharp turning property is exhibited. Also, in medium-speed running, the rear wheels are scarcely steered in the ordinary range of steering wheel angle, and in high-speed running, the protrusion is incapable of engaging with the notch, so that the rear wheels are not steered at all, by which the straight-line running property is improved.

On the other hand, there has been disclosed a rear front axle wheel steering system for a rear two-axle vehicle (Japanese Utility Model Publication 1994-21818) (hereinafter referred to as a second conventional example). The system is configured so that rear front wheels can be steered in phase with the front wheels in relation to the front wheel steering, the steering angle of the rear front wheel is controlled slightly more than the steering angle of the front wheel in the range in which the steering angle of the front wheel is small, and the steering angle of the rear front wheel is controlled slightly less than the steering angle of the front wheel in the range in which the steering angle of the front wheel is large. In this steering system, a pitman arm for the front wheel steering system is connected to a front wheel knuckle arm via a drag link, and the drag link is connected to a rear wheel knuckle arm via a relay rod. The rear wheel knuckle arm is provided with an elongated groove, and the relay rod is slidably connected to the elongated groove via a pin. Also, the elongated groove has a first guide groove for controlling the rear front wheels with a slightly larger steering angle than the front wheels, a pair of second guide grooves provided in front and rear of the first guide groove to control the rear front wheels with a slightly smaller steering angle than the front wheel, and a pair of inclined intermediate groove connecting the first guide groove to the second guide grooves.

In the steering system configured as described above, a lever ratio of the lever length of the rear wheel knuckle arm to the lever length of the front wheel knuckle arm is changed according to the magnitude of the front wheel steering angle. As a result, at the time of high-speed running when the steering angle is small, the rear front wheels are made in phase with the front wheels and the steering angle thereof is made slightly larger than the steering angle of the front wheel, whereby the steering stability can be improved. Also, at the time of low-speed running when the steering angle is large, the rear front wheels are made in phase with the front wheels and the steering angle thereof is made slightly smaller than the steering angle of the front wheel, so that the rear front wheels are rotated smoothly in turning.

However, in the case where the first conventional example is applied to the second conventional example, that is, the configuration is such that on a rear two-axle vehicle, the steering angle ratio of rear front wheel to front wheel is made high at the time of low speed, the steering angle ratio is decreased as the vehicle speed increases, and further when the vehicle speed is not lower than a predetermined value, the steering angle ratio is made zero, the rear wheels are steered even if the vehicle speed is zero. Therefore, for example, if a difference in steering angle between the target steering angle and the actually-measured steering angle of the rear front wheel is large, the vehicle cannot be started smoothly. Also, if an attempt is made to decrease the difference in steering angle between the target steering angle and the actually-measured steering angle of the rear front wheel when the vehicle speed is zero, a large steering force for the rear front wheels is needed, so that an actuator for steering the rear front wheels must be made large in size.

SUMMARY OF THE INVENTION

An object of the present invention is to provide a rear front wheel steering control system for a rear two-axle vehicle, which can steer rear front wheels by means of relatively small sized rear front wheel steering means, and thereby can start a vehicle smoothly.

The present invention provides a rear front wheel steering control system for a rear two-axle vehicle, comprising front wheel steering means driven by an engine for steering front wheels; rear front wheel steering means driven by the engine for steering rear front wheels; a front steering angle sensor for detecting a steering angle $\delta_f$ of the front wheel; a vehicle speed sensor for detecting a vehicle speed V; and a controller for controlling the engine and for controlling the rear front wheel steering means so as to steer the rear front wheels in the same direction as that of the front wheels based on the detection outputs of the front steering angle sensor and the vehicle speed sensor, wherein the rear front wheel steering control system further comprises a rear steering angle sensor for detecting a steering angle $\delta_r$ of the rear front wheel; and when the vehicle speed sensor detects a vehicle speed V lower than a first reference value $V_0$, and a difference in steering angle between a target steering angle $\delta_p$ of the rear front wheel based on the steering angle $\delta_f$ of the front wheel calculated by the controller and an actually-measured steering angle $\delta_r$ of the rear front wheel detected by the rear steering angle sensor is not smaller than a second reference value $\delta_0$, the controller increases the rotational speed N of the engine to a third reference value $N_0$; and when the difference in steering angle becomes smaller than the second reference value $\delta_0$ or when a predetermined time $T_0$ has elapsed, the controller returns the rotational speed N of the engine to the original value.

According to the present invention, when the vehicle is stopped, the actually-measured steering angle $\delta_r$ of the rear front wheel is sometimes different greatly from the target steering angle $\delta_p$ thereof. If the engine is restarted in this state, the controller reads the detection outputs of the front steering angle sensor, the rear steering angle sensor, and the vehicle speed sensor, and then calculates the target steering angle $\delta_p$ of the rear front wheel with respect to the steering angle $\delta_f$ of the front wheel. At this time, the vehicle is stopped in an idling state, so that the controller judges from the detection output of the vehicle speed sensor that the vehicle speed V is lower than the first reference value $V_0$. Next, the controller calculates the difference in steering angle between the target steering angle $\delta_p$ and the actually-measured steering angle $\delta_r$ of the rear front wheel, compares the difference in steering angle with the second reference value $\delta_0$, and judges that the difference in steering angle is not smaller than the second reference value $\delta_0$. Therefore, the controller increases the rotational speed of the engine to the third reference value $N_0$, and then actuates the rear front wheel steering means for steering the rear front wheels. When the difference in steering angle between the target steering angle $\delta_p$ and the actually-measured steering angle $\delta_r$ of the rear front wheel becomes smaller than the second reference value $\delta_0$ or when the rear front wheel steering means is actuated and the predetermined time $T_0$ has elapsed, the rear front wheel steering means is stopped, and thereafter the rotational speed of the engine is returned to the original value.

DETAILED DESCRIPTION OF THE PREFERRED EMBODIMENTS

An embodiment of the present invention will now be described with reference to the accompanying drawings.

Figure 1:
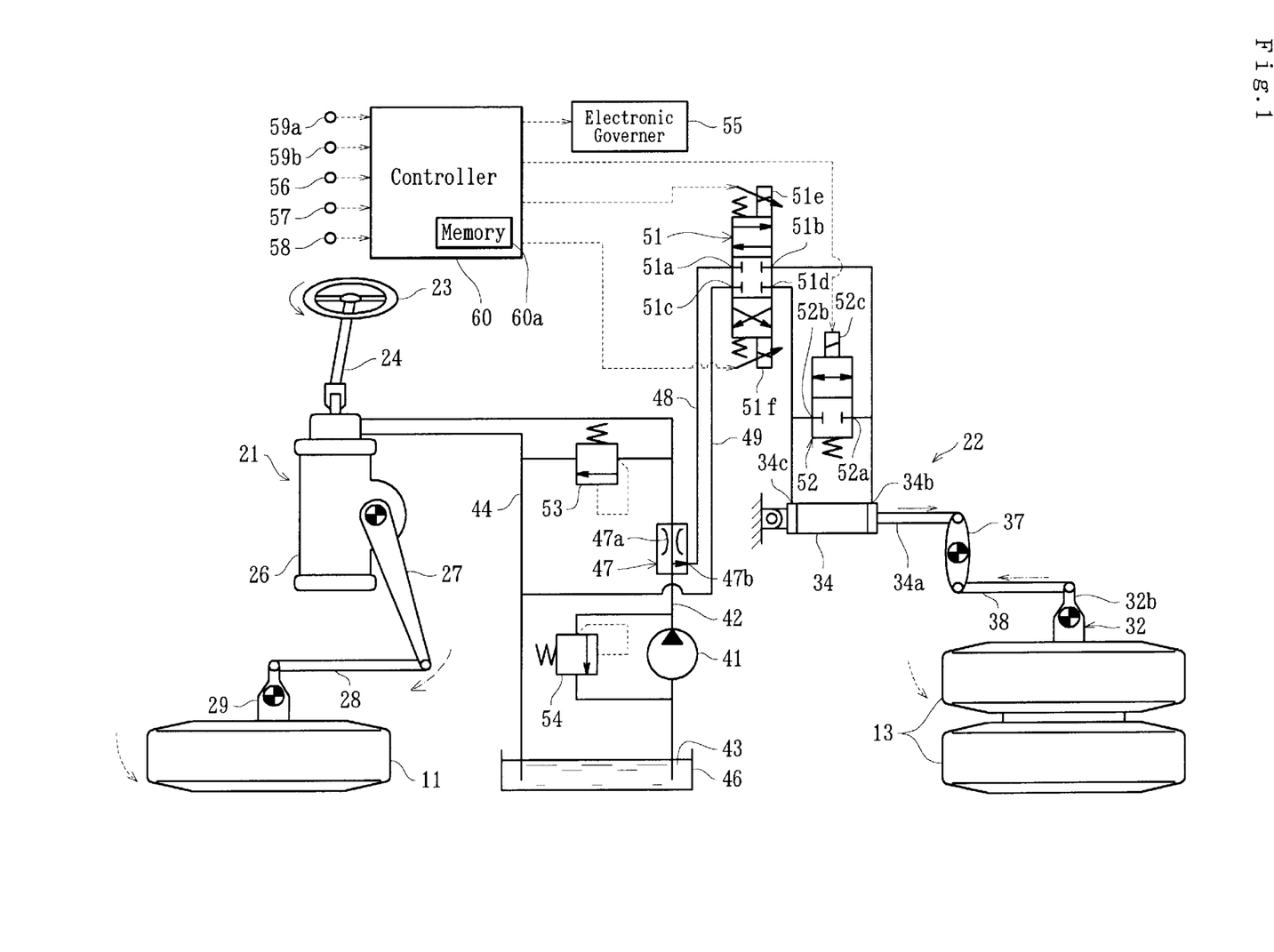
FIG. 1 is a schematic view of a control circuit for a rear wheel steering control system in accordance with an embodiment of the present invention.
Figure 2:
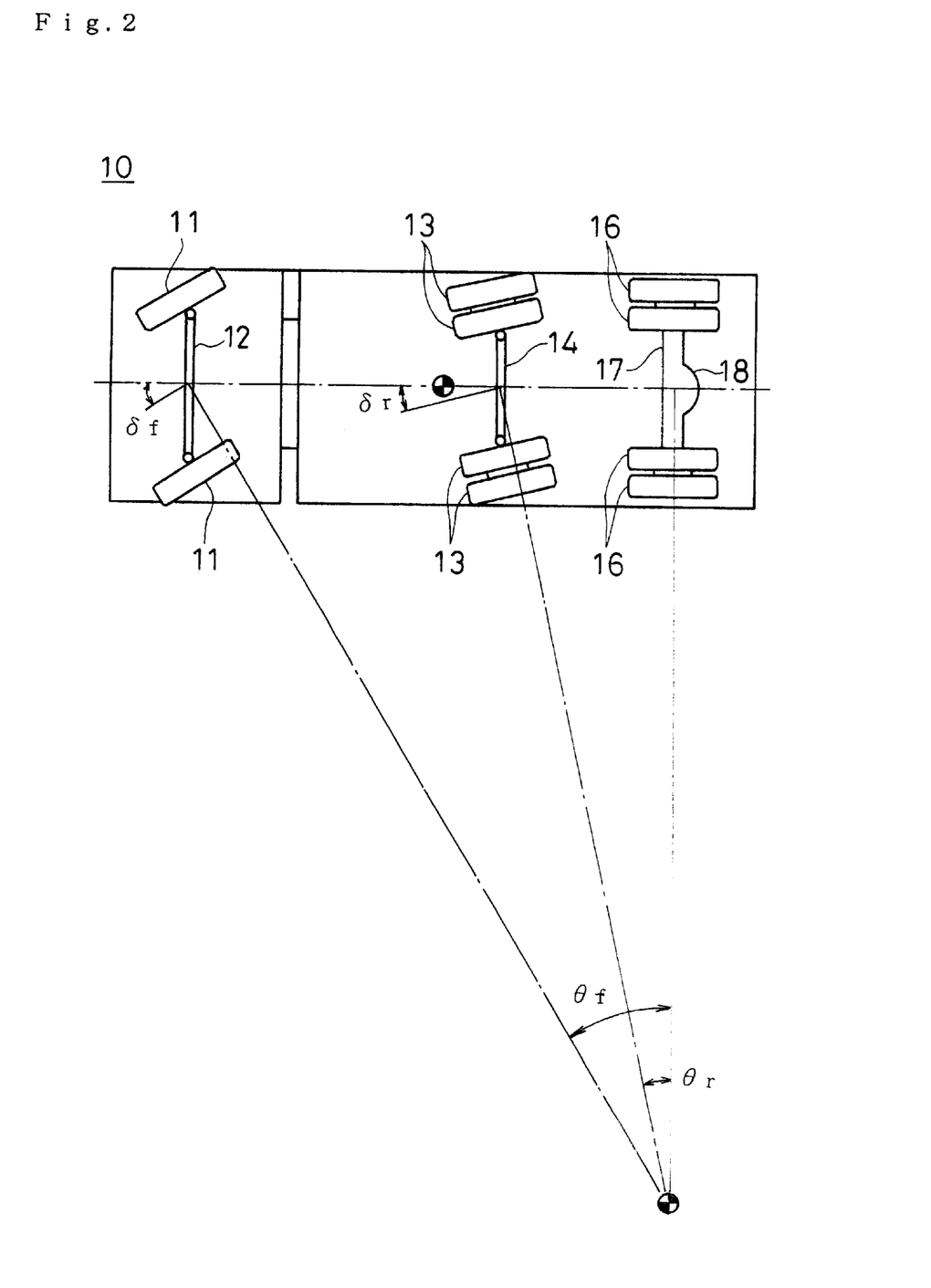
FIG. 2 is a plan view showing a configuration of a truck mounted with the system shown in FIG. 1.
Figure 3:
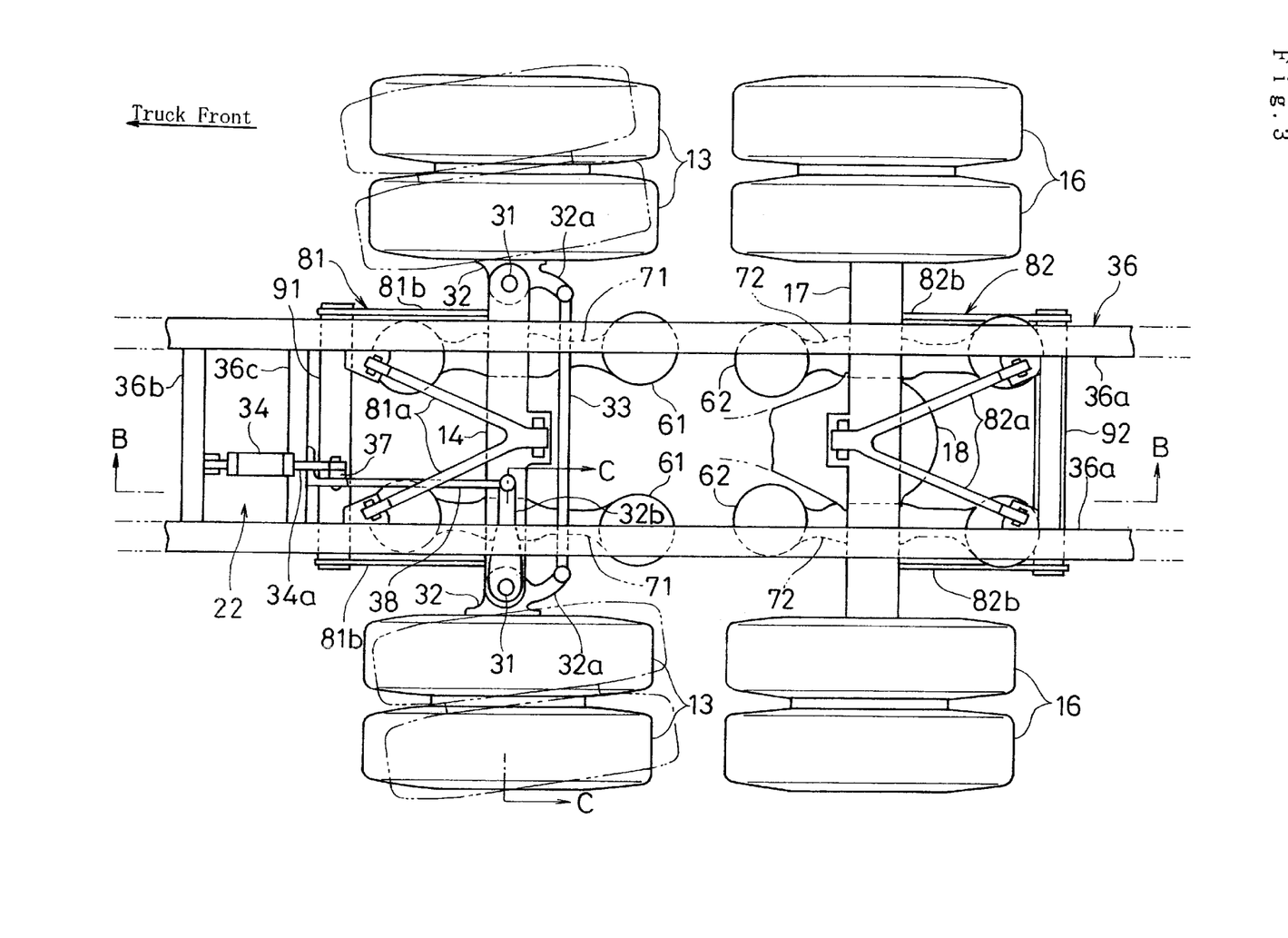
FIG. 3 is a view taken in the direction of the arrow A in FIG. 4.
Figure 4:
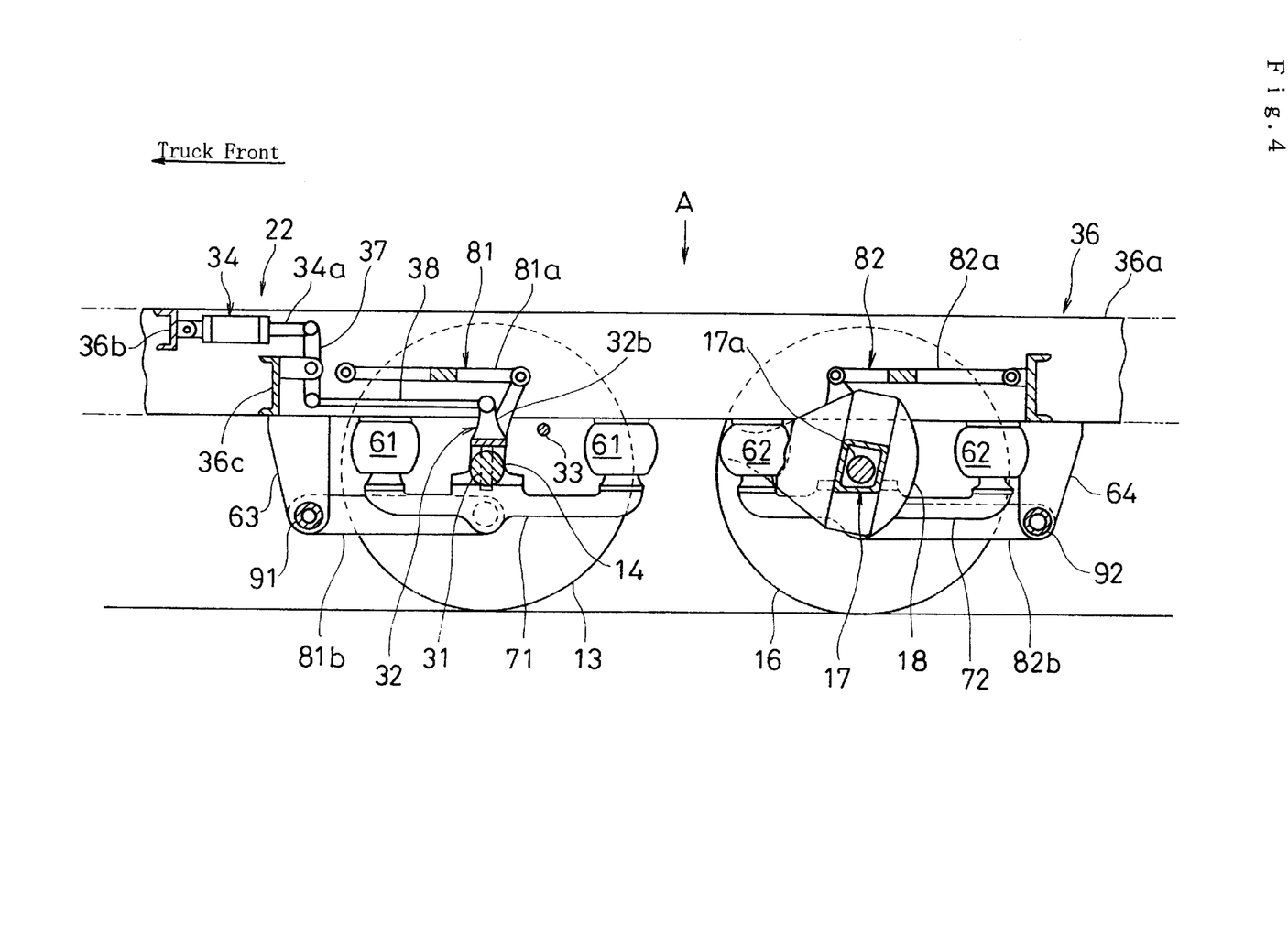
FIG. 4 is a sectional view taken along the line B—B of FIG. 3.

As shown in FIG. 2, a truck 10 has a front axle 12 fitted with front wheels 11 at both ends, a rear front axle 14 fitted with rear front wheels 13 at both ends, and a rear rear axle 17 fitted with rear rear wheels 16 at both ends. In this embodiment, the front wheels 11 and the rear front wheels 13 are configured so as to be capable of being steered, and the rear rear wheels 16 are configured so as to be incapable of being steered (FIGS. 1 and 2). The rear rear axle 17 is provided with a differential 18 (FIGS. 2 to 4). The configuration is such that a driving force generated by an engine is transmitted to the differential 18 via a not illustrated transmission and propeller shaft, and is transmitted to the rear rear wheels 16 via a drive shaft 17a (FIG. 4) of the rear rear axle 17. Also, the configuration is such that the front wheels 11 are steered by front wheel steering means 21, and the rear front wheels 13 are steered by rear front wheel steering means 22.

As shown in FIG. 1, the front wheel steering means 21 includes a power steering system 26 connected to a steering wheel 23 via a steering shaft 24, and a front knuckle 29 connected to the power steering system 26 via a pitman arm 27 and a front drag link 28. The front knuckle 29 is rotatably fitted with a front wheel 11. In this embodiment, the power steering system 26 is an integral type power steering system in which a control valve and a power cylinder are formed integrally with a steering gear, which assists the steering force of the steering wheel 23.

Figure 5:
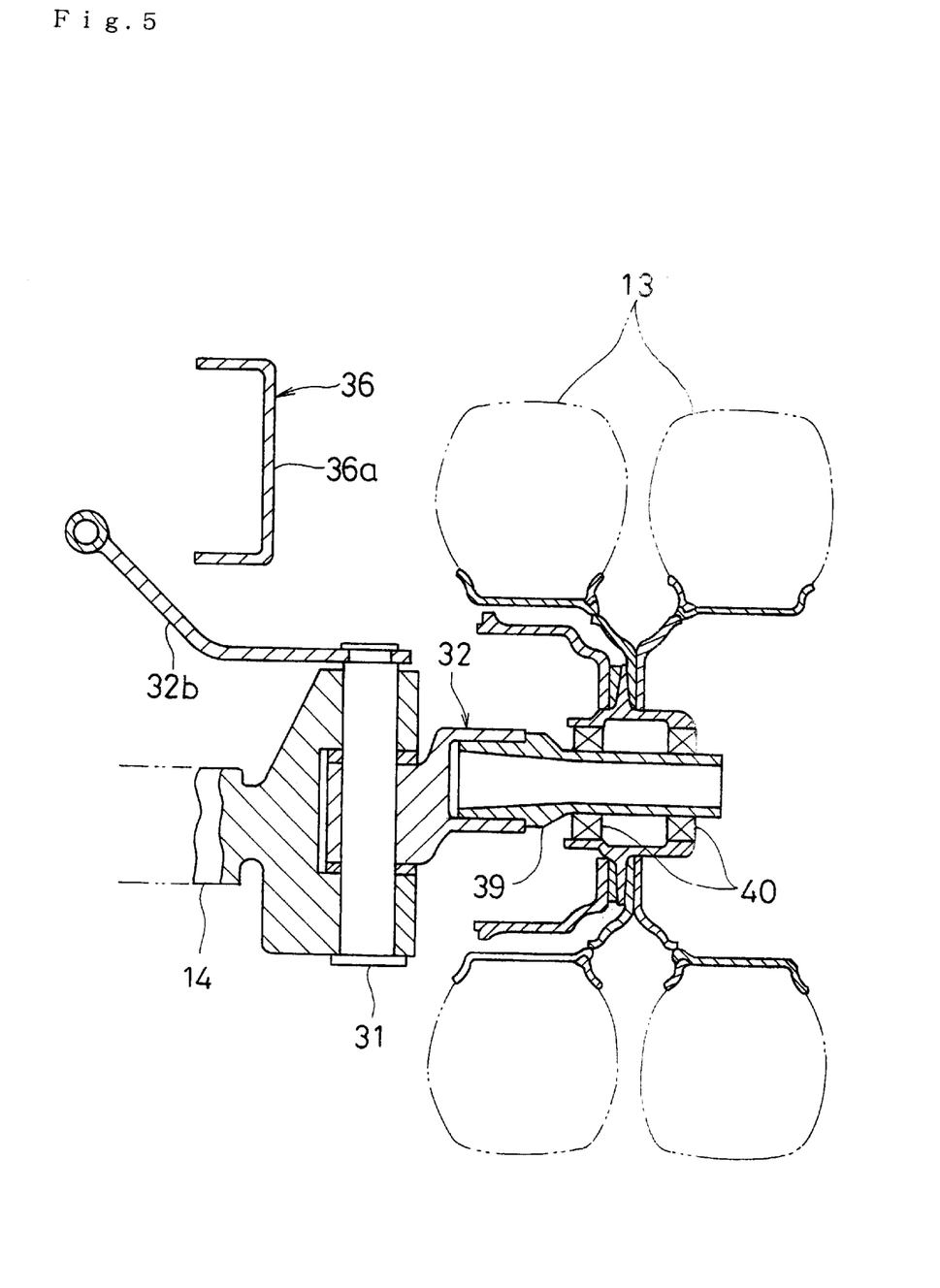
FIG. 5 is a sectional view taken along the line C—C of FIG. 3.

As shown in FIGS. 3 to 5, the rear front wheel steering means 22 includes a pair of rear knuckles 32, 32 pivotally mounted at both ends of the rear front axle 14 via a pair of rear kingpins 31, 31, a rear tie rod 33 which is provided so as to extend in the vehicle width direction at the rear of the rear front axle 14 and both ends of which are connected to connecting arms 32a, 32a (FIG. 3) of the paired rear knuckles 32, 32, and knuckle arms 32a the proximal end of which is fitted to one rear kingpin 31 and the distal end of which is connected to a piston rod 34a of a hydraulic cylinder 34. A first cross member 36b is installed to a pair of side members 36a, 36a of a chassis frame 36 so as to be located in front of the rear front axle 14, and a second cross member 36c is installed so as to be located between the rear front axle 14 and the first cross member 36b (FIGS. 3 and 4).

The proximal end of the hydraulic cylinder 34 is pivotally mounted to the first cross member 36b, and the piston rod 34a of the hydraulic cylinder 34 projects rearward and is connected to the upper end of an oscillating link 37. A substantially central portion of the oscillating link 37 is pivotally mounted to the second cross member 36c. The lower end of the oscillating link 37 is connected with the front end of a rear drag link 38, and the rear end of the rear drag link 38 is connected to the distal end of the knuckle arm 32a (FIGS. 3 and 4). The rear kingpin 31 is inserted in the end portion of the rear front axle 14 so as to be rotatable, and is inserted in the proximal end portion of the rear knuckle 32 so as to be non-rotatable (FIG. 5). Also, a driven shaft 39 is inserted in the distal end portion of rear knuckle 32, and the rear front wheels 13 are installed to the driven shaft 39 via bearings 40 so as to be rotatable. The configuration is such that by the extension and contraction of the piston rod 34a of the hydraulic cylinder 34, the rear front wheels 13 are steered via the oscillating link 37, the rear drag link 38, the rear knuckle 32, and the rear tie rod 33.

On the other hand, as shown in FIG. 1, the steering control system is configured so that hydraulic oil 43 is supplied from a hydraulic pump 41 driven by the engine to the power steering system 26 through a main supply pipe 42, and the hydraulic oil 43 discharged from the power steering system 26 is returned to an oil tank 46 through a main return pipe 44. The main supply pipe 42 is provided with a flow dividing valve 47, and the flow dividing valve 47 has a throttle portion 47a and a branch port 47b. The branch port 47b is connected to a first port 34b of the hydraulic cylinder 34 via a branch supply pipe 48, and a second port 34c of the hydraulic cylinder 34 is connected to the main return pipe 44 via a branch return pipe 49. The branch supply pipe 48 and the branch return pipe 49 are provided with a proportional control valve 51 and a cutoff valve 52.

The configuration is such that the hydraulic oil 43 supplied to the flow dividing valve 47 by the hydraulic pump 41 is throttled to a fixed flow rate by the throttle portion 47a, and the hydraulic oil 43 exceeding the fixed flow rate is supplied to the hydraulic cylinder 34 through the branch port 47b.

The proportional control valve 51 is a four-port three-position switching electromagnetic valve. A first port 51a is connected to the branch supply pipe 48 on the side of the flow dividing valve 47, and a second port 51b is connected to the branch supply pipe 48 on the side of the hydraulic cylinder 34. Also, a third port 51c is connected to the branch return pipe 49 on the side of the flow dividing valve 47, and a fourth port 51d connected to the branch return pipe 49 on the side of the hydraulic cylinder 34. The valve 51 is configured as described below. Switching control is carried out electromagnetically and mechanically (spring) by first and second control sections 51e and 51f. If the first control section 51e is turned on and the second control section 51f is turned off, the first and second ports 51a and 51b are connected to each other, and the third and fourth ports 51c and 51d are connected to each other. If the first control section 51e is turned off and the second control section 51f is turned on, the first and fourth ports 51a and 51d are connected to each other, and the second and third ports 51b and 51c are connected to each other. Further, if both of the first and second control sections 51e and 51f are turned off, the ports 51a to 51d are shut off.

The cutoff valve 52 is a two-port two-position switching electromagnetic valve. A first port 52a is connected to the branch supply pipe 48, and a second port 52b is connected to the branch return pipe 49. The valve 52 is configured as described below. Switching control is carried out electromagnetically and mechanically (spring) by a control section 52c. If the control section 52b is turned on, the first and second ports 52a and 52a are connected to each other, and if the control section 52c is turned off, the first and second ports 52a and 52a are shut off. If the hydraulic cylinder 34 fails, the valve 52 is turned on. Reference numerals 53 and 54 in FIG. 1 denote relief valves. Also, reference numeral 55 denotes an electronic governor for controlling the amount of fuel injection to the engine according to the depression stroke of an accelerator pedal (not shown).

The power steering system 26 is provided with a front steering angle sensor 56 for detecting the rotational angle of the pitman arm 27, and in the vicinity of the oscillating link 37 is provided a rear steering angle sensor 57 for detecting the rotational angle of the oscillating link 37. Reference numeral 58 in FIG. 1 denotes a vehicle speed sensor for detecting the vehicle speed of a truck. Also, reference numerals 59a and 59b denote an engine rotation sensor for detecting the rotational speed of the engine and an engine load sensor for detecting the load of the engine, respectively. The detection outputs of the front steering angle sensor 56, the rear steering angle sensor 57, the vehicle speed sensor 58, the engine rotation sensor 59a, and the engine load sensor 59b are connected to the control inputs of a controller 60, and the control outputs of the controller 60 are connected to the first and second control sections 51e and 51f of the proportional control valve 51, the control section 52c of the cutoff valve 52, and the electronic governor 55.

The controller 60 is configured so as to calculate a difference in steering angle between a target steering angle $\delta_p$ of the rear front wheel 13 based on an actually-measured steering angle $\delta_f$ of the front wheel and an actually-measured steering angle $\delta_r$ of the rear front wheel 13 detected by the rear steering angle sensor 57. Also, the controller 60 is provided with a memory 60a. The memory 60a stores a first reference value $V_0$ that is compared with a vehicle speed V detected by the vehicle speed sensor 58, a second reference value $\delta_0$ that is compared with the difference in steering angle between the target steering angle $\delta_p$ and the actually-measured steering angle $\delta_r$ of the rear front wheel 13, and a third reference value $N_0$ that is compared with an actual rotational speed N of the engine. The first reference value $V_0$ is preferably a predetermined value (for example, 1 km/hour) in the range in which the value exceeds 0 km/hour and is not higher than 3 km/hour. The second reference value $\delta_0$ is preferably a predetermined value (for example, 3 degrees) in the range in which the value is not smaller than 3 degrees and not larger than 6 degrees. Further, the third reference value $N_0$ is preferably a predetermined value (for example, 600 rpm) in the range in which the value is not lower than 500 rpm and not higher than 600 rpm.

The reason why the first reference value $V_0$ is limited to within the range in which the value exceeds 0 km/hour and is not higher than 3 km/hour is that if the value exceeds 3 km/hour, the rear front wheels 13 can be steered smoothly without an increase in the engine rotational speed N. The reason why the second reference value $\delta_0$ is limited to within the range in which the value is not smaller than 3 degrees and not larger than 6 degrees is that if the value is smaller than 3 degrees, the rear front wheels 13 can be steered smoothly without an increase in the engine rotational speed N, and if the value exceeds 6 degrees, it is sometimes difficult to start the truck 10. Also, the reason why the third reference value $N_0$ is limited to within the range in which the value is not lower than 500 rpm and not higher than 600 rpm is that if the value is lower than 500 rpm, the engine rotational speed N is too low to provide a sufficient hydraulic oil discharge amount of the hydraulic pump 41, so that sometimes steering cannot be performed, and if the value exceeds 600 rpm, the fuel economy becomes low, and the hydraulic pump 41 falls within a zone in which the rotational speed is not proportional to the discharge amount, so that the discharge amount of the hydraulic pump 41 does not increase, whereby the hydraulic pump 41 is made inefficient. Further, the controller 60 is connected with a timer (not shown).

Figure 6:
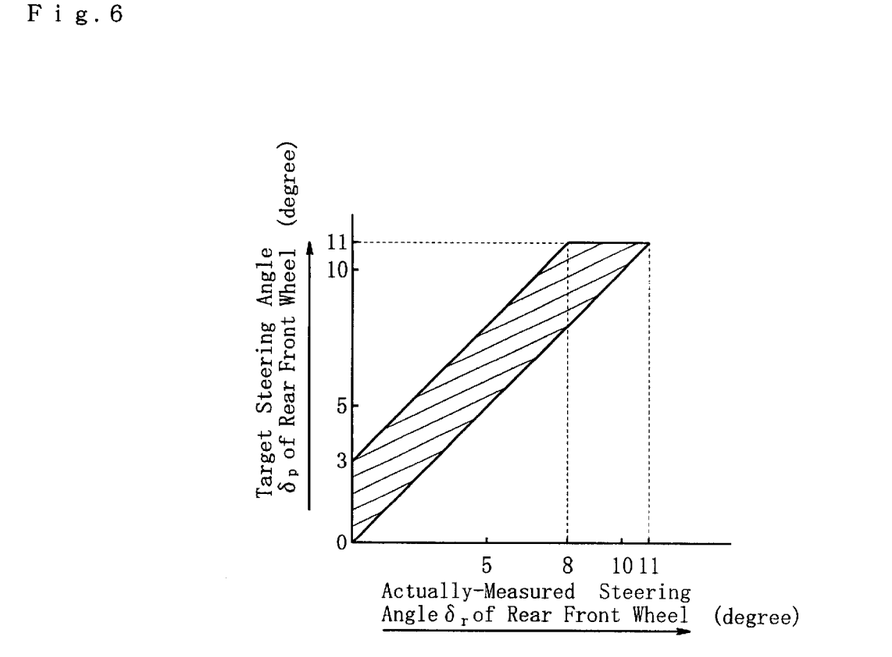
FIG. 6 is a chart showing an allowable range of a difference in rear front wheel steering angle capable of starting a truck when a first reference value is made 3 degrees.

The hatched portion in FIG. 6 indicates an allowable range of the difference in steering angle between the target steering angle $\delta_p$ and the actually-measured steering angle $\delta_r$ of the rear front wheel 13 in which the truck 10 can be started when the second reference value $\delta_0$ is 3 degrees.

Figure 7:
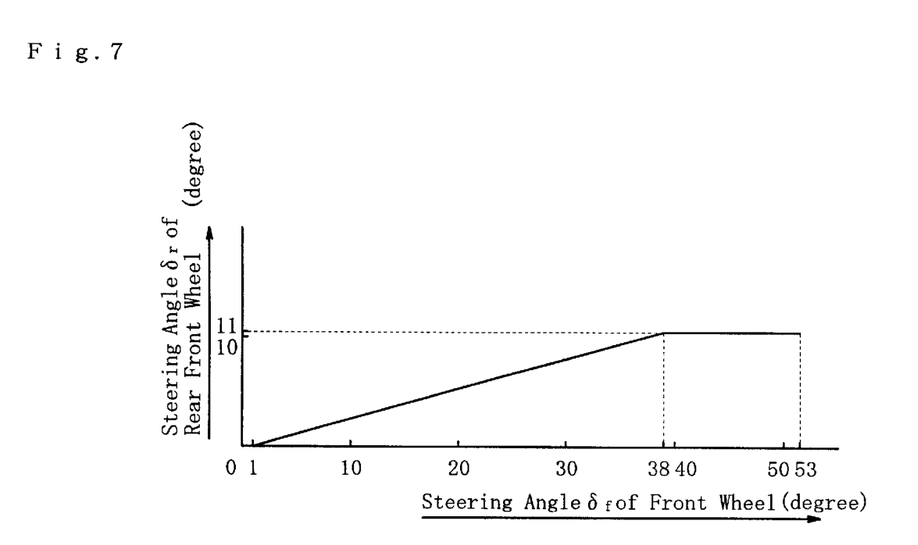
FIG. 7 is a chart showing a change in rear front wheel steering angle with respect to a change in front wheel steering angle.

Also, the memory 60*a* stores the steering angle $\delta_r$ of the rear front wheel 13 with respect to the steering angle $\delta_f$ of the front wheel 11 as shown in FIG. 7. Specifically, in the range in which the steering angle $\delta_f$ of the front wheel 11 of FIG. 7 is from 0 to 1 degree, the steering angle $\delta_r$ of the rear front wheel 13 is made 0 degree to ensure stability in high-speed running (this range is referred to as a neutral dead zone). In the range in which the steering angle $\delta_f$ of the front wheel 11 is from 1 to 38 degrees, the rear front wheels 13 are steered with a predetermined steering angle ratio ($\delta_r/\delta_f$=0.29). If the steering angle $\delta_f$ of the front wheel 11 exceeds 38 degrees, the steering angle $\delta_r$ of the rear front wheel 13 is restricted by the chassis frame 36 or the like, so that the steering angle $\delta_r$ of the rear front wheel 13 is kept at 11 degrees. Also, $\theta_f$ in FIG. 2 denotes the Ackermann steering angle of the front wheel 11, and $\theta_r$ denotes the Ackermann steering angle of the rear front wheel 13.

Returning to FIGS. 3 and 4, the chassis frame 36 is mounted on the rear front axle 14 via first springs 61, and is mounted on the rear rear axle 17 via second springs 62. In this embodiment, the first and second springs 61 and 62 are air springs. The centers of a pair of first supports 71, 71 extending substantially in parallel with the paired side members 36*a*, 36*a* of the chassis frame 36 are installed on the lower face of the rear front axle 14. Between the front ends and the rear ends of the first supports 71, 71 and the paired side members 36*a*, 36*a* are interposed the four first springs 61 (FIG. 3). Also, the centers of a pair of second supports 72, 72 extending substantially in parallel with the paired side members 36*a*, 36*a* are installed on the lower face of the rear rear axle 17. Between the front ends and the rear ends of the first supports 71, 71 and the paired side members 36*a*, 36*a* are interposed the four second springs 62.

The rear front axle 14 and the rear rear axle 17 are connected to the chassis frame 36 by a first and second torque rods 81 and 82 to restrain tramping, wind-up, and the like (FIGS. 3 and 4). The first torque rod 81 includes a pair of first upper rods 81*a*, 81*a*, the rear end of which is pivotally mounted to the central upper portion of the rear front axle 14 and the front end of which is pivotally mounted to the chassis frame 36 in front of the rear front axle 14, and a pair of first lower rods 81*b*, 81*b*, the rear end of which is pivotally mounted to the center of the paired first supports 71, 71 and the front end of which is fixed to each end of a first stabilizer bar 91 in front of the rear front axle 14. Also, the second torque rod 82 includes a pair of second upper rods 82*a*, 82*a*, the front end of which is pivotally mounted to the central upper portion of the rear rear axle 17 and the rear end of which is pivotally mounted to the chassis frame 36 at the rear of the rear rear axle 17, and a pair of second lower rods 82*b*, 82*b*, the front end of which is pivotally mounted to the center of the paired second supports 72, 72 and the rear end of which is fixed to each end of a second stabilizer bar 92 at the rear of the rear rear axle 17. The first stabilizer bar 91 is rotatably held by front brackets 63 (FIG. 4) depending from the paired side members 36*a*, 36*a*, and the second stabilizer bar 92 is rotatably held by rear brackets 64 (FIG. 4) depending from the paired side members 36*a*, 36*a*.

Figure 8:
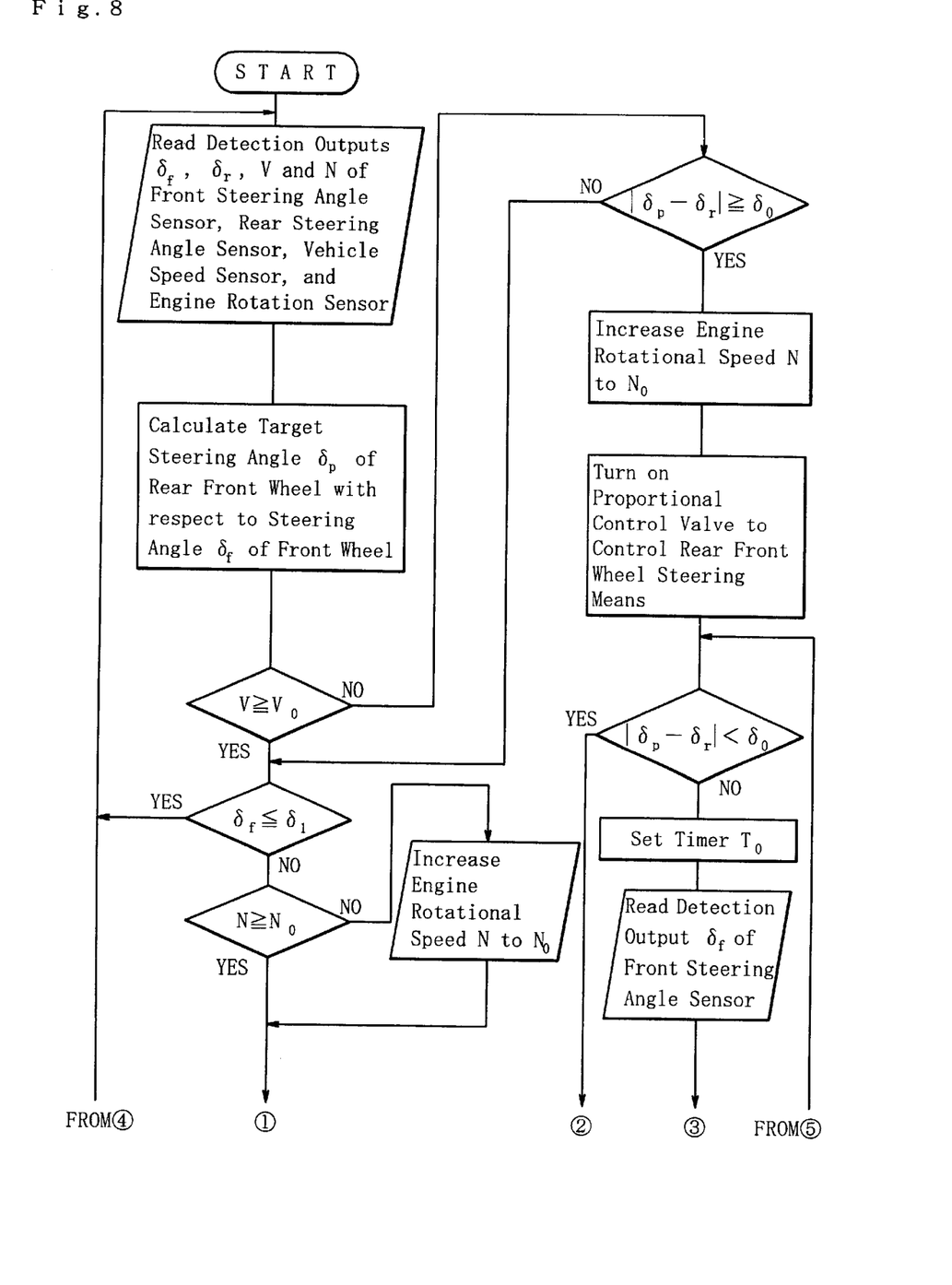
FIG. 8 is a flowchart showing the first half of the operation of the system.
Figure 9:
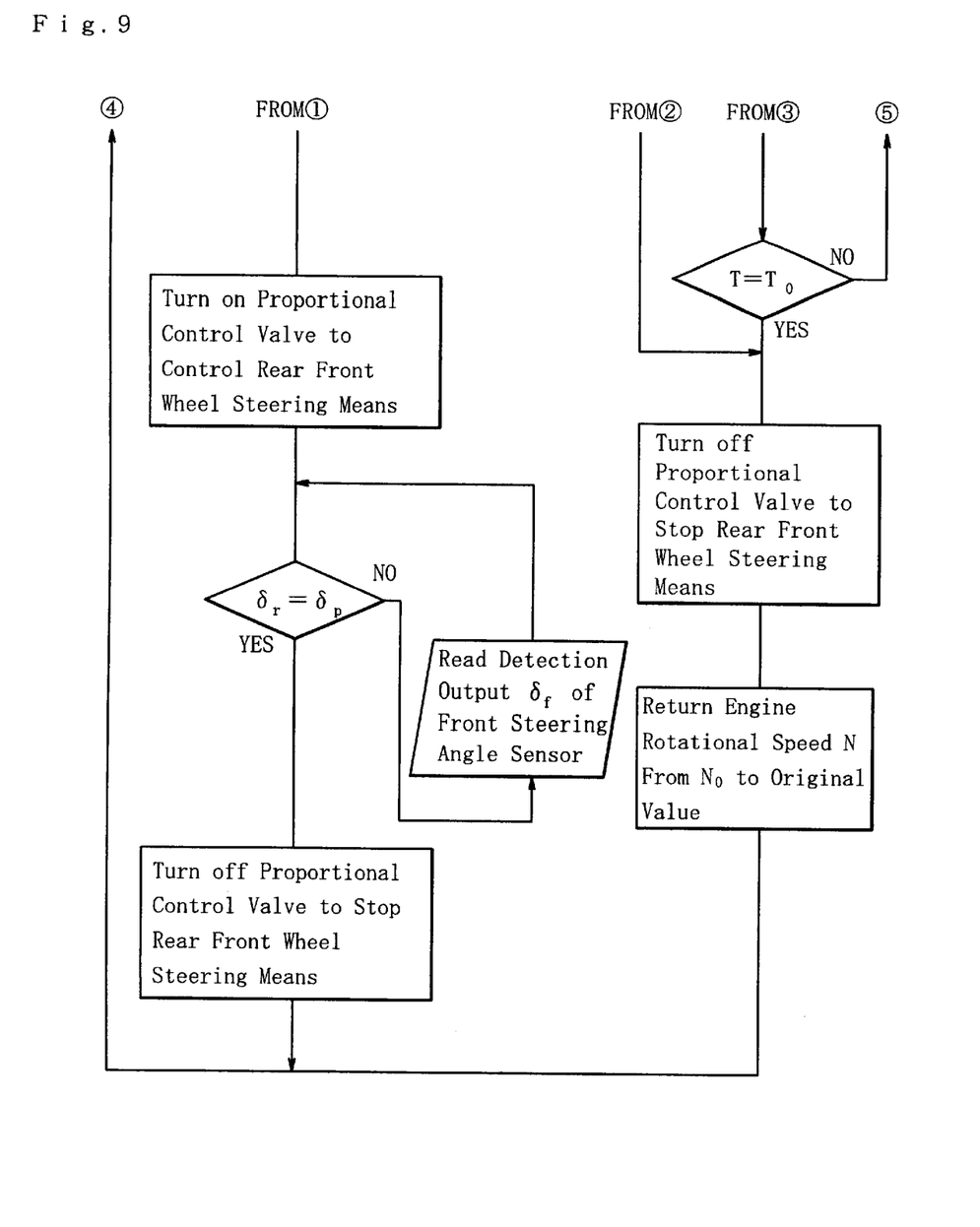
FIG. 9 is a flowchart showing the second half of the operation of the system.

The operation of the rear front wheel steering control system configured as described above will be described below with reference to a flowchart of FIGS. 8 and 9.

When the truck 10 is stopped at a predetermined place in a parking lot or the like, the actually-measured steering angle $\delta_r$ of the rear front wheel 13 usually agrees with the target steering angle $\delta_p$ thereof. If the engine is restarted in this state, the controller 60 reads the detection outputs of the front steering angle sensor 56, the rear steering angle sensor 57, the vehicle speed sensor 58, and the engine rotation sensor 59*a*, and then calculates the target steering angle $\delta_p$ of the rear front wheel 13 with respect to the steering angle $\delta_f$ of the front wheel 11. At this time, the truck 10 is stopped in an idling state, so that the vehicle speed V detected by the vehicle speed sensor 58 is 0 km/hour. The controller 60 compares the detection output of the vehicle speed sensor 58 with the first reference value $V_0$ (for example, 1 km/hour) stored in the memory 60*a*, and judges that the vehicle speed V is lower than the first reference value $V_0$. Next, the controller 60 calculates the absolute value of the difference in steering angle between the target steering angle $\delta_p$ and the actually-measured steering angle $\delta_r$ of the rear front wheel 13, and compares the absolute value of the difference in steering angle with the second reference value $\delta_0$ (for example, 3 degrees) stored in the memory 60*a*. The controller 60 judges that the absolute value of the difference in steering angle between the target steering angle $\delta_p$ and the actually-measured steering angle $\delta_r$ of the rear front wheel 13 is smaller than the second reference value $60_0$. If the truck 10 is started in this state, the truck 10 starts smoothly. If the truck 10 starts and the vehicle speed becomes not lower than the first reference value $V_0$, and the actually-measured steering angle $\delta_f$ of the front wheel 11 is in the neutral dead zone not larger than $\delta_1$ (for example, in the range from 0 to 1 degree), the controller 60 repeatedly reads the detection outputs of the front steering angle sensor 56 and the like, and keeps the proportional control valve 51 in an off state.

If the driver turns the steering wheel 23, for example, in the left direction during running, the front wheels 11 turn in the direction indicated by the broken-line arrow mark, and the actually-measured steering angle $\delta_f$ of the front wheel 11 goes beyond the range of the neutral dead zone $\delta_1$. At this time, if the engine rotational speed N is not lower than the third reference value $N_0$ (for example, 600 rpm), the controller 60 does not carry out the control. If the engine rotational speed N is lower than the third reference value $N_0$, the controller 60 controls the electronic governor 55 to increase the engine rotational speed N to the third reference value $N_0$, and then turns on the second control section 51*f* of the proportional control valve 51. Thereby, the first and fourth ports 51*a* and 51*d* of the proportional control valve 51 are connected to each other, and the second and third ports 51*b* and 51*c* are connected to each other. Therefore, the hydraulic oil 43 is supplied to an cylinder head side chamber (not shown) of the hydraulic cylinder 34 through the second port 34*c* of the hydraulic cylinder 34, and the hydraulic oil 43 in a cylinder rod side chamber (not shown) of the hydraulic cylinder 34 is discharged through the first port 34*b* of the hydraulic cylinder 34. Thereupon, the piston rod 34*a* projects in the direction indicated by the solid line in FIG. 1, and the rear drag link 38 moves in the direction indicated by the dash-and-dot line arrow mark. Accordingly, the rear front wheels 13 are turned in the same direction as that of the front wheels 11, that is, in the direction indicated by the broken-line arrow mark. The angle of rotation of the oscillating link 37 is fed back to the control input of the controller 60, and when the actually-measured steering angle $\delta_r$ of the rear front wheel 13 becomes equal to the target steering angle $\delta_p$, the second control section 51*f* of the proportional control valve 51 is turned off.

On the other hand, when the truck 10 is stopped at a predetermined place in a parking lot or the like, the actually-measured steering angle $\delta_r$ of the rear front wheel 13 is sometimes different greatly from the target steering angle $\delta_p$ thereof. This occurs, for example, in the case where after the truck 10 is stopped and the steering wheel 23 is turned in the right direction, the steering wheel 23 is turned suddenly in the left direction and the engine is stopped before the target steering angle $\delta_p$ is reached. If the engine is restarted in this state, the controller 60 reads the detection outputs of the front steering angle sensor 56, the rear steering angle sensor 57, the vehicle speed sensor 58, and the engine rotation sensor 59a, and then calculates the target steering angle $\delta_p$ of the rear front wheel 13 with respect to the steering angle $\delta_f$ of the front wheel 11 as described above. At this time, the truck 10 is stopped in an idling state, so that the vehicle speed V detected by the vehicle speed sensor 58 is 0 km/hour. The controller 60 compares the detection output of the vehicle speed sensor 58 with the first reference value $V_0$ stored in the memory 60a, and judges that the vehicle speed V is lower than the first reference value $V_0$. Next, the controller 60 calculates the absolute value of the difference in steering angle between the target steering angle $\delta_p$ and the actually-measured steering angle $\delta_r$ of the rear front wheel 13, and compares the absolute value of the difference in steering angle with the second reference value $\delta_0$ stored in the memory 60a. The controller 60 judges that the absolute value of the difference in steering angle is not smaller than the second reference value $\delta_0$. Therefore, the controller 60 controls the electronic governor 55 to increase the rotational speed of the engine to the third reference value $N_0$.

In this state, the controller 60 turns on the second control section 51f of the proportional control valve 51.

Thereby, the first and fourth ports 51a and 51d of the proportional control valve 51 are connected to each other, and the second and third ports 51b and 51c are connected to each other as described above. Therefore, the hydraulic oil 43 is supplied to the cylinder head side chamber (not shown) of the hydraulic cylinder 34 through the second port 34c of the hydraulic cylinder 34, and the hydraulic oil 43 in the cylinder rod side chamber (not shown) of the hydraulic cylinder 34 is discharged through the first port 34b of the hydraulic cylinder 34. Thereupon, the piston rod 34a projects in the direction indicated by the solid line in FIG. 1, and the rear drag link 38 moves in the direction indicated by the dash-and-dot line arrow mark. Accordingly, the rear front wheels 13 are turned in the direction indicated by the broken-line arrow mark. The angle of rotation of the oscillating link 37 is fed back to the control input of the controller 60, and when the absolute value of the difference in steering angle between the target steering angle $\delta_p$ and the actually-measured steering angle $\delta_r$ of the rear front wheel 13 becomes smaller than the second reference value $\delta_0$, the second control section 51f of the proportional control valve 51 is turned off, and the rotational speed of the engine is returned to the original value. As a result, since the difference in steering angle between the target steering angle $\delta_p$ and the actually-measured steering angle $\delta_r$ of the rear front wheel 13 is smaller than the second reference value $\delta_0$, the truck 10 can start smoothly.

At the same time the controller 60 turns on the second control section 51f of the proportional control valve 51, it sets the timer at $T_0$ seconds (for example, 10 seconds). Thereby, when the absolute value of the difference in steering angle between the target steering angle $67_p$ and the actually-measured steering angle $\delta_r$ of the rear front wheel 13 does not become smaller than the second reference value $\delta_0$ in the $T_0$ seconds, after $T_0$ seconds have elapsed, the second control section 51f of the proportional control valve 51 is turned off, and the rotational speed of the engine is returned to the original value. This is done to prevent a rise in oil temperature caused by continuous application of a great pressure to the hydraulic cylinder 34.

Also, in the case where after the truck 10 is stopped and, in reverse of the above, the steering wheel 23 is turned in the left direction, the steering wheel 23 is turned suddenly in the right direction and the engine is stopped before the target steering angle $\delta_p$ is reached, the controller 60 turns on the first control section 51e of the proportional control valve 51. Thereby, the first and second ports 51a and 51b of the proportional control valve 51 are connected to each other, and the third and fourth ports 51c and 51d are connected to each other. Therefore, the hydraulic oil 43 is supplied to the cylinder rod side chamber of the hydraulic cylinder 34 through the first port 34b of the hydraulic cylinder 34, and the hydraulic oil 43 in the cylinder head side chamber of the hydraulic cylinder 34 is discharged through the second port 34c of the hydraulic cylinder 34. As a result, the piston rod 34a retracts, so that the rear front wheels are turned in the direction opposite to the above. When the absolute value of the difference in steering angle between the target steering angle $\delta_p$ and the actually-measured steering angle $\delta_r$ of the rear front wheel 13 becomes smaller than the second reference value $\delta_0$, the controller 60 turns off the first control section 51e of the proportional control valve 51 to stop the supply of the hydraulic oil 43 to the hydraulic cylinder 34, and further returns the rotational speed of the engine to the original value.

As described above, according to the present invention, the front wheel steering means and the rear front wheel steering means are driven by the engine, and the controller controls the engine, and also controls the rear front wheel steering means so as to steer the rear front wheels in the same direction as that of the front wheels based on the detection outputs of the front steering angle sensor for detecting the steering angle of the front wheel and the vehicle speed sensor for detecting the vehicle speed. Therefore, when the vehicle speed sensor detects a vehicle speed lower than the first reference value, and the difference in steering angle between the target steering angle of the rear front wheel based on the steering angle of the front wheel and the actually-measured steering angle of the rear front wheel is larger than the second reference value, the controller increases the rotational speed of the engine to the third reference value. Also, when the difference in steering angle becomes smaller than the second reference value or when a predetermined time has elapsed, the controller returns the rotational speed of the engine to the original value. As a result, the difference in steering angle between the target steering angle and the actually-measured steering angle of the rear front wheel becomes smaller than the second reference value, so that the vehicle can be started smoothly.

Also, since the driving force of the rear front wheel steering means is increased by the increase in the rotational speed of the engine, the rear front wheel steering means need not be made large in size.

What is claimed is:

1. A rear front wheel steering control system for a rear two-axle vehicle, comprising:

front wheel steering means driven by an engine for steering front wheels;

rear front wheel steering means driven by said engine for steering rear front wheels;

a front steering angle sensor for detecting a steering angle of said front wheel;

a vehicle speed sensor for detecting a vehicle speed; and a controller for controlling said engine and for controlling said rear front wheel steering means so as to steer said rear front wheels in the same direction as that of said front wheels based on the detection outputs of said front steering angle sensor and said vehicle speed sensor, wherein said rear front wheel steering control system further comprises a rear steering angle sensor for detecting a steering angle of said rear front wheel;

when said vehicle speed sensor detects a vehicle speed lower than a first reference value, and a difference in steering angle between a target steering angle of said rear front wheel based on the steering angle of said front wheel calculated by said controller and an actually-measured steering angle of said rear front wheel detected by said rear steering angle sensor is not smaller than a second reference value, said controller increases the rotational speed of said engine to a third reference value; and when said difference in steering angle becomes smaller than the second reference value or when a predetermined time has elapsed, said controller returns the rotational speed of said engine to the original value.

2. The rear front wheel steering control system for a rear two-axle vehicle according to claim 1, wherein said first reference value is a predetermined value in the range in which the value exceeds 0 km/hour and is not higher than 3 km/hour.

3. The rear front wheel steering control system for a rear two-axle vehicle according to claim 1, wherein said second reference value is a predetermined value in the range in which the value is not smaller than 3 degrees and not larger than 6 degrees.

4. The rear front wheel steering control system for a rear two-axle vehicle according to claim 1, wherein said third reference value is a predetermined value in the range in which the value is not lower than 500 rpm and not higher than 600 rpm.

* * * * *